Jan. 13, 1953 H. F. UNGER 2,625,411
SPRINKLER ROTATING SPINNER DRIVE SAND SEAL
Filed April 25, 1949 2 SHEETS—SHEET 1
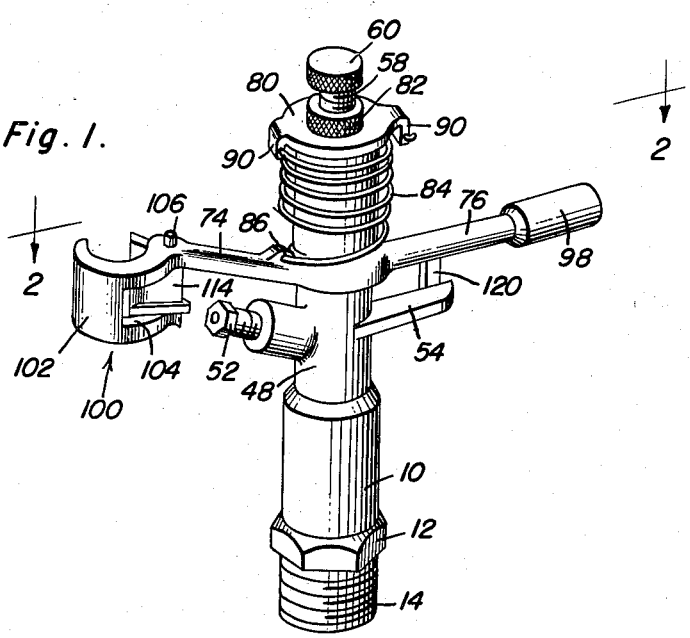
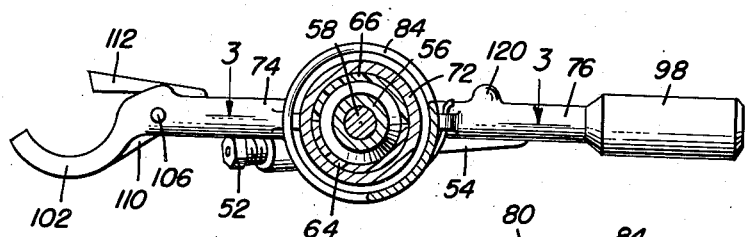
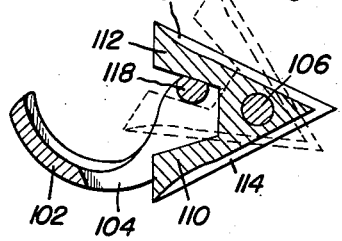
Inventor
Hector F. Unger
By *Clarence A. O'Brien and Harvey B. Jacobson*
Attorneys Jan. 13, 1953 H. F. UNGER 2,625,411
SPRINKLER ROTATING SPINNER DRIVE SAND SEAL
Filed April 25, 1949 2 SHEETS—SHEET 2

Inventor

Hector F. Unger

By *Clarence A. O'Brien and Harvey B. Jackson*
Attorneys

Patented Jan. 13, 1953

2,625,411

UNITED STATES PATENT OFFICE 2,625,411

SPRINKLER ROTATING SPINNER DRIVE SAND SEAL

Hector F. Unger, Portland, Oreg.; Dolores Jane Unger executrix of said Hector F. Unger, deceased Application April 25, 1949, Serial No. 89,420

3 Claims. (Cl. 285—97.5)

1

This invention comprises novel and useful improvements in a sprinkler rotating spinner drive sand seal and more specifically pertains to an improved sealing means for preventing the ingress of sand or other foreign matter into the bearings of a rotating water sprinkler.

The primary object of this invention is to prevent the entrance of solid foreign matter into the bearings of a rotating sprinkler spinner.

A further important object of the invention is to employ the pressure of the liquid supplied to a sprinkler to assist in attaining the above object more effectively.

A very important feature of the invention resides in the provision of a resilient sealing member for the bearing assembly of a rotating water sprinkler.

A further feature of the invention is to provide a resilient sealing member in accordance with the preceding feature which may be easily applied to the shank portion of the sprinkler.

Yet another feature of the invention contemplates the provision of a resilient sealing member in accordance with the foregoing features wherein the sealing member forms an endwise seal covering the conterminous lower edges of the bearing and shank assembly.

A still further feature of the invention resides in the provision of a yieldable or resilient sealing member which is yieldingly retained between opposed parallel shoulders of the shank and a surrounding surface of the bearing and seal sleeve member.

A further important feature of the invention contemplates the provision of a resilient seal which is so located as to have its lower surface only exposed to the pressure of the liquid, whereby this pressure will enhance the sealing action of the resilient member.

And a final important feature of the invention to be specifically enumerated herein, resides in the provision of a seal of a resilient nature which is received and retained in operative position by and between the sleeve of the bearing assembly and shoulders on the shank assembly.

These, together with various ancillary objects and features of the invention which will later become apparent as the following description proceeds, are attained by the present invention, a preferred embodiment of which has been illustrated by way of example in the accompanying drawings, wherein:

Figure 1 is a perspective view of a rotating sprinkler for which the novel sand seal of this invention is particularly adapted;

Figure 2 is a horizontal sectional view, taken substantially upon the plane of the section line 2—2 of Figure 1, showing the sprinkler body and spinner drive in top plan view;

Figure 3:
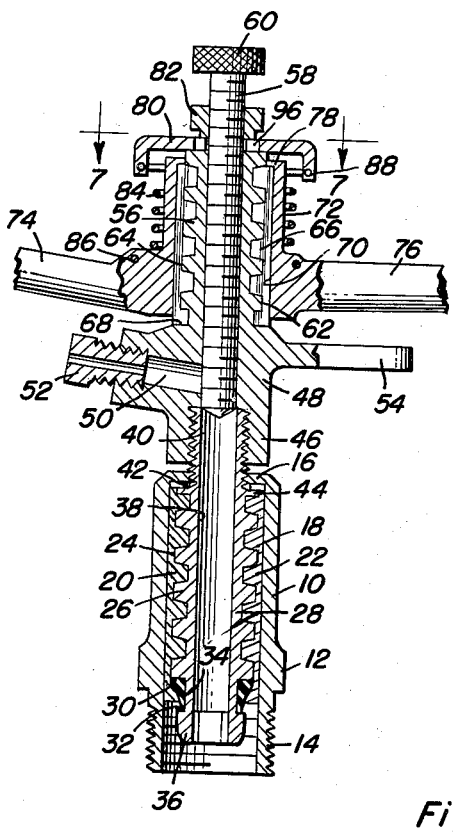
Figure 3 is a vertical, central sectional view.
Figure 4:
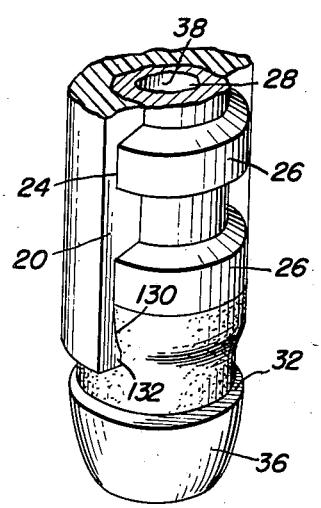
Figure 5:
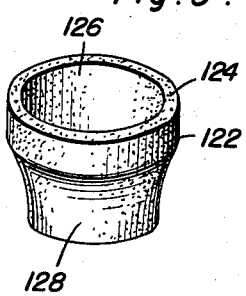

2 taken substantially upon the plane of the section line 3—3 of Figure 2, showing the internal structure of the sprinkler mechanism with which the sand seal is associated;

Figure 4 is a fragmentary perspective view upon an enlarged scale of the arrangement of the sand seal with the associated parts of the bearing sleeve and shank, parts being broken away;

Figure 5 is a perspective view of the novel, resilient sand seal forming the essence of this invention;

Figure 6 is a fragmentary, horizontal sectional view of a portion of the oscillating, rotary drive of the sprinkler, and alternative positions of the oscillating baffle being shown in dotted lines; and Figure 7 is a horizontal sectional view of the tension adjusting means of the oscillating, rotary drive of the sprinkler, being taken substantially upon the horizontal plane of the section line 7—7 of Figure 3.

The present invention relates generally to improvements in a water sprinkler of the rotating spinner type, and discloses subject matter which in some respects is a continuation in part of the invention set forth in my co-pending application Serial No. 16,267, filed March 22, 1948, although the invention claimed in the present case relates to a sand seal for use with the invention set forth in the above mentioned application, and which sand seal is particularly adapted to the improved form of rotating sprinkler disclosed herein.

Referring now more specifically to the accompanying drawings, wherein like numerals designate similar parts throughout the various views, attention is directed first to Figures 1 and 3 wherein the numeral 10 designates a body or casing which may be of cylindrical form as shown, and provided with a shouldered portion 12, by means of which the lower externally threaded portion 14 of the casing may be screw threadedly connected to any suitable source of water or other fluid to be sprayed by the rotating sprinkler, as desired. The body or casing 10 at its upper end is provided with an annular top wall 16 which is provided with an axial opening for a purpose to be later set forth, and is provided with an internal cylindrical bearing surface 18 in which is rotatably received two complementary semi-cylindrical bearing sleeves 20 and 22, which on their inner surfaces are provided with longitudinally spaced, parallel, circumferentially disposed grooves 24 which snugly and rotatably receive correspondingly positioned and shaped circumferential, annular ribs or collars 26 which are formed upon the exterior surface of a tubular shank 28, forming the hub of a rotating sprinkler assembly.

The shank 28, as will be more apparent from

Figure 3, is provided adjacent its lower end with a pair of parallel, horizontally disposed upper and lower annular shoulders 30 and 32, between which is disposed the cylindrical surface 34 of an annular groove, while at its lower end the shank terminates in a beveled or tapering head 36.

At its upper end, the shank 28 which is provided with an axial bore 38 extending throughout its length, terminates in an externally threaded portion 40 which is loosely and rotatably received in the aperture in the top wall 16 of the casing 10. A suitable thrust collar or washer 42 may surround the threaded portion 40 between an annular bearing 44 on the shank 28 and the undersurface of the upper wall 16, to thereby limit upward movement of the shank and bearing assembly in the casing 10, the shank being retained therein by means of the internally screw threaded lower portion 46 of a sprinkler head 48.

As will be readily seen from Figures 1 and 3, the sprinkler head is provided with an outwardly extending bore 50 which is in communication with the screw threaded bore in which the extremity 40 of the shank is received, and at its outer end the outwardly extending bore 50 is provided with a spray nozzle 52 of any suitable construction for directing water radially outwardly from the rotating and oscillating spinner head. Opposite the nozzle 52, the body 53 is provided with an oppositely extending arm 54 for a purpose to be later set forth. In alignment with the internally threaded portion 46, the head 48 is provided with an integral upwardly extending extension 56 of reduced diameter, which extension is internally bored and screw threaded for the reception of a control valve 58 having a knurled finger-grip head 60 and adapted to cooperate with the end of the outwardly extending passage 50 for throttling the flow therethrough or closing off this flow as desired.

The upper extremity 56 may likewise be formed with the longitudinally spaced, parallel annular ribs or collars 62 which cooperate with semicylindrical sealing and bearing members 64 and 66 which are provided with complementary grooves for receiving the above mentioned ribs 62. These bearing sleeves 64 and 66 at their lower ends rest upon a horizontal bearing surface 68 formed on the upper portion of the sprinkler head 48, and are received within a cylindrical bore 70 formed in the cylindrical hub 72 having a pair of oppositely extending arms 74 and 76. The hub 72 and the arms 74 and 76 constitute an oscillating member for imparting an oscillating and rotary motion to the sprinkler assembly as set forth hereinafter.

At its upper end, the sleeve-like hub 72 is provided with an annular inturned top partition 78 which serves to retain the bearing sleeves 64 and 66 in place, and a combined spring adjusting cap 80 and hub retaining member is maintained upon the extension 56 by means of a lock nut 82 carried by the above mentioned screw 58.

A tension spring 84 surrounds the sleeve portion 72 and has its lower end anchored as in an aperture 86 on the arm 74, while its upper end extends through and is secured within suitable apertures 88 formed in downturned lugs 90 on the cap 80.

As will be more readily seen from Figure 7, taken in conjunction with Figure 3, the cap 80 is provided with a central aperture 92 having a plurality of radially disposed slots 94, which may be selectively engaged upon a retaining pin 96 extending upwardly from the end of the extension 56 upon which the cap 80 rests. It will thus be seen that by releasing the locking nut 82, the cap 80 may be raised upon the screw 58 and rotated to selectively tension the spring 84, whereupon the cap may be pressed down with one of the slots 94 engaging the pin 96, and upon tightening of the locking nut 82 the cap will be secured in its adjusted position, whereby any predetermined tension may be applied to the spring 84 for thus urging the hub 72 and the oppositely extending arms 74 and 76 in a predetermined direction for a purpose to be later set forth.

One of the arms such as that at 76, is provided with a counterweight or counterbalance 98 for balancing a sprinkler deflecting and oscillating member indicated generally by the numeral 100.

As will be more readily seen from Figures 1, 2 and 6, the arm 74 is provided with an arcuately extending extremity 102 which has a slotted portion 104 disposed in substantial alignment with the axis of the nozzle 52 whereby the spray emitted therefrom will be directed towards the slot 104. Journaled in the slot 104 for oscillation about a vertical pivot 106 is a V-shaped gate or baffle having angularly inclined legs 110 and 112, these legs having vertically disposed baffle surfaces 114 and 116 respectively. As will be seen the leg 110 is disposed to oscillate through the slot 104 as shown by the full and dotted lines in Figure 6 which show the two extremes of movement of the V-shaped gate member, a lug 118 carried by the member 102 serving to limit the oscillatory movement of the V-shaped baffle. The arrangement is such that the impingement of the spray from the nozzle 52 will in the full line position of Figure 6 strike the baffle surface 114, at a point to one side of the pivot 106, whereby the V-shaped baffle will be urged in a clockwise direction into the dotted line position shown in Figure 6. The impact with which the leg 110 strikes the stop 118 will thus impart a shock or impulse tending to rotate the arms 74 and 76 in a clockwise direction as viewed in Figures 1 and 2. When the baffle moves to its dotted line position as shown in Figure 6, the impinging spray will now strike the other surface 116, which is now disposed to intercept the spray as the same is directed at the slot 104, so that the baffle is now again shifted back to its full line position. An opposite shock or impact is thus again imparted to the abutment 118 and to the members 74 and 76 tending to produce, and producing a rotation in a counterclockwise direction. It will be seen that the members 74 and 76 by means of the pivoting V-shaped baffle will be oscillated continuously while the spray from the nozzle 52 impinges upon the baffle surfaces.

Conveniently carried by the arm 76, is a downwardly extending lug 120 which is adapted to engage one side of the oppositely extending arm 54 of the sprinkler head 48. It will now be seen that as the oscillating arms 74 and 76 move in one direction, they are opposed by the previously adjusted tension of the tension spring 84, and this tension applied through the cap 80, slot 94 and pin 96 to the sprinkler extension 56, tends to rotate the sprinkler body 48 and the sprinkler nozzle 52. As the V-shaped baffle oscillates, thus reversing the side thrust of the sprinkler jet, the arms 74 and 76 are oscillated in a reverse direction, and the impact of the lug 120 against the arm 54 serves to oscillate the sprinkler head in the reverse direction. However, due to the fact that the sprinkler nozzle 52 is offset from and inclined with respect to the axis of the arms 74 and 76, there is a slight tendency to cause oscillation in one direction greater than the tendency to oscillate in the other direction. Thus, the baffle assembly and through it the sprinkler head, are caused to oscillate back and forth continuously, while the entire assembly is slowly rotating step by step in a constant direction of rotation. By this means, an automatic oscillating and rotating spinner drive is effected whereby the sprinkler nozzle 52 is enabled to thoroughly cover and spray the area for which the same is designed. Obviously, by adjusting the tension of the spring 84, the length of time required for one complete revolution of the sprinkler head may obviously be adjusted.

In devices of this nature, the rotation and oscillation of the sprinkler head and shank assembly in the casing 10 obviously produces a wear in the bearings, although this wear is minimized by the semi-cylindrical bearing sleeves 20 and 22 above mentioned. This wear is further aggravated by reason of the entry of sand, or other foreign matter of a solid nature into the device through the water supply to the sprinkler. The entry of sand into this bearing seal obviously abrades and destroys the sealing engagement whereby water seeps up through the tortuous sealing passages, and escapes at the upper end thereof through the annular opening in the top partition 16. This leakage in time sufficiently destroys the effective pressure of the water so that the latter is no longer capable of satisfactorily oscillating and rotating the device. In order to prevent and minimize such wear, the sand seal forming the subject of this invention has been provided for excluding sand and other foreign solid matter from entry into the bearing sleeves.

As shown in Figure 5, this seal consists of a flexible and yieldable bushing having a cylindrical upper portion 122 with a flat, horizontally disposed annular top surface 124, a cylindrical interior surface 126, and a depending sleeve 128 at the lower end thereof, which sleeve at its lower end likewise terminates in a flat annular horizontally disposed surface parallel to the surface 124. As shown in Figure 5, the sleeve 128 is of progressively decreasing exterior diameter, merging into the cylindrical member 122 at its upper end.

The sealing member which may be of rubber, a suitable plastic or any other yieldable and resilient material, is of sufficient size to be pushed over the extremity 36 of the shank 28, and is snugly seated between the shoulders 30 and 32 and upon the cylindrical bearing surface 34 of the annular groove, with the upper and lower horizontal surfaces of the sleeve being tightly engaged with the shoulders 30 and 32.

The diameter of the headed portion 36 is slightly greater than the external diameter of the lower portion of the sleeve 128, so that the lower end of the sleeve is snugly retained in the annular groove and thus prevented from unintentional removal from the shank 28. As shown more clearly in Figure 4, the interior surface of the complementary bearing and sealing members 20 and 22, are at their lower end provided with a correspondingly shaped curved interior surface 130 adapted to conform to and snugly embrace the cylindrical and the tapering surface of the sleeve member, and are likewise provided at their lower end with an inturned lip portion 132.

It will be seen that the surfaces 130 and 132 thus overlie the annular groove in the lower end of the shank, and that the yieldable sand seal snugly fits the space between the groove and the curved inner surfaces of the sleeves. By this means, the under portion of the curving exterior surface 128 is exposed to the water pressure, tending to press the yieldable sand seal upwardly into tight sealing engagement with the lower surface of the annular rib 26 and the adjacent surface of the sleeves 20 and 22, thereby sealing the conterminous edges of the sleeves and the shank.

During operation, this upward pressure of the water upon the shank will press the entire shank assembly upwardly against the washer 42 and the lower surface of the top partition 16, to establish a tight water seal at this point, while the shank and sleeve assembly will rotate freely in the casing 10.

From the foregoing, the construction and operation of the device will be readily apparent and further explanation is believed to be unnecessary.

However, since numerous modifications and changes will readily occur to those skilled in the art after a consideration of the foregoing specification and accompanying drawings, it is not desired to limit the invention to the exact construction shown and described. Accordingly, all suitable modifications and equivalents may be resorted to, falling within the scope of the appended claims.

Having thus disclosed and described the invention what is claimed as new is as follows:

1. In a water sprinkler having a hollow casing and a hollow shank rotatable therein and a bearing sleeve in said casing surrounding said shank and rotatably journaling the latter in said casing; a plurality of annular ribs on said shank forming pairs of opposed shoulders therebetween, a plurality of annular ribs and grooves on the inner surface of said bearing sleeve complementary to the ribs on the shank, one of said ribs on said bearing sleeve surrounding said shank and being rotatably received between and engaged with a pair of said opposed shoulders on said shank, a resilient annular seal surrounding said shank between another pair of said opposed shoulders, said bearing sleeve having a portion surrounding said resilient seal.

2. The combination of claim 1 wherein said resilient seal has parallel annular portions resiliently engaging said other pair of opposed shoulders.

3. The combination of claim 2 wherein said annular seal includes a cylindrical upper portion and a lower portion of progressively decreasing external diameter from its upper to its lower end, said portion of said bearing sleeve being of progressively downwardly decreasing internal diameter to enclose the lower portion of said seal.

HECTOR F. UNGER.

REFERENCES CITED

The following references are of record in the file of this patent:

UNITED STATES PATENTS

| Number | Name | Date |
|---|---|---|
| 927,403 | Cameron | July 6, 1909 |
| 1,760,588 | Eby | May 27, 1930 |
| 1,923,775 | Crowley | Aug. 22, 1933 |
| 2,135,221 | Scheiwer | Nov. 1, 1938 |
| 2,160,121 | Buckner | May 30, 1939 |
| 2,223,441 | Coles et al. | Dec. 31, 1940 |
| 2,380,101 | Englehart | July 10, 1945 |
| 2,429,929 | Fisher | Oct. 28, 1947 |